United States Patent
Najjar et al.

(10) Patent No.: US 12,486,088 B2
(45) Date of Patent: Dec. 2, 2025

(54) CABLE TIE

(71) Applicant: EVLR International AB, Stockholm (SE)

(72) Inventors: Folke Najjar, Sigtuna (SE); Tobias Bergarp, Sollentuna (SE); Sigrid Svedberg, Bandhagen (SE)

(73) Assignee: EVLR INTERNATIONAL AB, Sollentuna (SE)

( * ) Notice: Subject to any disclaimer, the term of this patent is extended or adjusted under 35 U.S.C. 154(b) by 0 days.

(21) Appl. No.: 18/032,155

(22) PCT Filed: Apr. 5, 2022

(86) PCT No.: PCT/SE2022/050335
§ 371 (c)(1),
(2) Date: Apr. 14, 2023

(87) PCT Pub. No.: WO2022/216202
PCT Pub. Date: Oct. 13, 2022

(65) Prior Publication Data
US 2023/0391520 A1    Dec. 7, 2023

(30) Foreign Application Priority Data
Apr. 7, 2021    (SE) .................................... 2150433-7

(51) Int. Cl.
*B65D 63/10*    (2006.01)
*F16L 3/233*    (2006.01)
*F16L 3/23*    (2006.01)

(52) U.S. Cl.
CPC ........ *B65D 63/1036* (2013.01); *F16L 3/2338* (2013.01)

(58) Field of Classification Search
CPC ............................ B65D 63/1036; F16L 3/2338
See application file for complete search history.

(56) References Cited

U.S. PATENT DOCUMENTS

| | | |
|---|---|---|
| 3,457,598 A | 7/1969 | Mariani |
| 5,079,803 A | 1/1992 | Moore |
| 5,121,524 A * | 6/1992 | Mortensen ............. B65D 63/14 24/17 AP |

(Continued)

FOREIGN PATENT DOCUMENTS

| | | |
|---|---|---|
| GB | 2530773 A | 4/2016 |
| JP | 07172457 A | 7/1995 |

*Primary Examiner* — David M Upchurch
(74) *Attorney, Agent, or Firm* — Stites & Harbison PLLC; Richard S. Myers, Jr.

(57) ABSTRACT

There is provided a cable tie (100) comprising: a cord (101) having a first end (102) and a second end (103), which cord comprises cellulosic fibers; and a locking head (104) fixedly attached to the first end (102), said locking head (104) being adapted to receive the second end (103) and retain the cable tie (100) in a closed loop configuration, wherein said locking head (104) defines (a) wall(s) (105) that encircles a passage (106) having an inlet (107) and an outlet (108) and comprises a metal blade (109) that extends into the passage (106) for engaging the cord (101) and which is arranged to allow displacement of the cord (101) in a first direction towards the outlet (108) while preventing displacement of the cord (101) in a second direction towards the inlet (107).

20 Claims, 3 Drawing Sheets

(56) References Cited

U.S. PATENT DOCUMENTS

| | | | | |
|---|---|---|---|---|
| 5,513,421 | A * | 5/1996 | Wells | B65D 63/1036 24/30.5 P |
| 5,621,949 | A * | 4/1997 | Wells | B65D 63/1036 24/17 AP |
| 5,630,252 | A * | 5/1997 | Wells | B65D 63/1036 24/30.5 P |
| 5,781,975 | A * | 7/1998 | Wells, Jr. | B65D 63/1036 24/30.5 P |
| 5,815,891 | A * | 10/1998 | Students | B65D 63/1036 24/17 AP |
| 2001/0025399 | A1 * | 10/2001 | Rohaly | B65D 63/16 24/30.5 R |
| 2002/0170150 | A1 | 11/2002 | Caveney et al. | |
| 2002/0170151 | A1 | 11/2002 | Caveney et al. | |
| 2002/0170152 | A1 | 11/2002 | Caveney et al. | |
| 2008/0196215 | A1 * | 8/2008 | Canady | B65D 63/1054 24/16 PB |
| 2013/0031751 | A1 * | 2/2013 | Bartholomew | B65D 63/1072 24/593.11 |
| 2017/0210528 | A1 * | 7/2017 | Burout | B65D 69/00 |
| 2018/0229906 | A1 * | 8/2018 | Bednarowski | B32B 3/04 |
| 2018/0282037 | A1 * | 10/2018 | Zant | B32B 5/08 |

\* cited by examiner

CABLE TIE

CROSS REFERENCE TO RELATED APPLICATIONS

This application is a § 371 National Phase Application of PCT/SE2022/050335 filed Apr. 5, 2022, which claims priority to SE2150433-7 filed Apr. 7, 2021.

TECHNICAL FIELD

The present disclosure relates to the field of cable ties, in particular environmentally friendly and tamper evident cable ties.

BACKGROUND

Cable ties (also referred to as zip ties or plastic straps) have long been used to secure cables and other articles together.

Cable ties are used in large quantities and many of them eventually end up in the environment after use and present a danger for animals that can get entangled or swallow them. Further, the commercially available cable ties are typically formed from plastic materials having large carbon footprint.

SUMMARY

An objective of the present disclosure is to provide a cable tie of reduced environmental impact. Another objective to is provide a cable tie that is strong, non-releasable and tamper evident.

To meet the first objective, the present inventors decided to use a cord of cellulosic fibers, such as a cord formed by twisting a paper strip along its length. To meet the other objective, the present inventors then experimented with different locking head designs. In this work, various designs of a locking head and a locking tooth (or looking teeth) molded in one piece in a plastic material were tested. However, none of these could provide a sufficiently strong and permanent tie. When pulled at a higher force, the cord slipped back through the locking head (i.e. the plastic tooth or teeth failed to prevent untying). The inventors found that to overcome this problem, it was necessary to replace the plastic tooth or teeth with a metal blade that extends into a passage formed by the locking head such that the walls of the passage prevents lateral movement by the cord, while the metal blade prevents the cord from being pulled back out from the passage.

Accordingly, the present disclosure provides a cable tie comprising:
- a cord having a first end and a second end, which cord comprises cellulosic fibers; and
- a locking head fixedly attached to the first end, said locking head being adapted to receive the second end and retain the cable tie in a closed loop configuration, wherein said locking head defines (a) wall(s) that encircles a passage having an inlet and an outlet and comprises a metal blade that extends into the passage for engaging the cord and which is arranged to allow displacement of the cord in a first direction towards the outlet while preventing displacement of the cord in a second direction towards the inlet.

Since the wall(s) encircles the passage, lateral movements of the cord in the passage are prevented, which facilitates the non-releasable tie.

To facilitate insertion of the second end, the inlet of the passage may be funnel-shaped, such as trumpet-shaped.

To facilitate manual insertion into and through the passage, the second end may be flattened. Such a flattened second end may be provided with grooves. Such grooves improve the grip when pulling the cord through the passage. The direction of the extension of the grooves is preferably substantially perpendicular to the longitudinal direction of the cord. The thickness of the flattened second end may for example be 0.7-1.3 mm, such as 0.9-1.0 mm. The width of the flattened second end may for example be 2.7-3.2 mm. The thickness to width ratio of the flattened second end is preferably between 1:2.7 and 1:3.5.

In an embodiment, the passage has a central axis and the angle between the direction of the extension of the blade and the central axis is 47°-62°, such as 50°-59°, such as 52°-57. Such an angle has been found to facilitate a strong tie and still allow insertion of the second end into the passage. Preferably, the metal blade intersects the central axis of the passage.

In an embodiment, the metal of the metal blade is steel, preferably stainless steel, such as austenitic stainless steel. A suitable example of an austenitic stainless steel is EN 1.4310.

The metal blade typically has an embedded portion and an extending portion. In such case, the blade may be embedded in a body portion of the locking head. The body portion preferably comprises a plastic material. To facilitate strength and a satisfactory resilient behavior of the extending portion, the length of the extending portion is preferably 20%-40% of the total length of the metal blade, such as 21%-35% of the total length of the metal blade. For example, the total length of the metal blade may be 3.5-7.0 mm, such as 4.5-6.0 mm.

For the same reasons, the length of the extending portion may be 55%-90% of the diameter of the cord, such as 70%-90% of the diameter of the cord.

Further, the width of the metal blade is preferably 60%-80%, such as 67%-73%, such as 73%-77% of the diameter of the cord and/or the thickness of the metal blade is preferably 7-20%, such as 10-15% of the diameter of the cord.

The diameter of the cord is preferably 26%-49%, such as 31%-46%, such as 36-42%, of the total length of the metal blade. In absolute terms, the diameter of the cord may be 1.0-8.0 mm, such as 1.8-6.0 mm.

In one embodiment, the cord is formed from hemp or paper, such as waxed paper. In contrast to conventional plastic straps, there is no need form "slots" or "pockets" in such a cord to facilitate locking.

The tensile strength of the cord may be 4-80 kg, such as 15-70 kg, measured according to ISO 2062:1993.

Suitably, the stretch at break of the cord is 2.5%-6.0%, such as 2.5%-5.0%, when measured according to ISO 2062: 1993.

The above-mentioned body portion is preferably of a biodegradable material, such as a bio composite of a biodegradable and/or renewable polymer and an organic fiber material.

DETAILED DESCRIPTION

Figure 1:
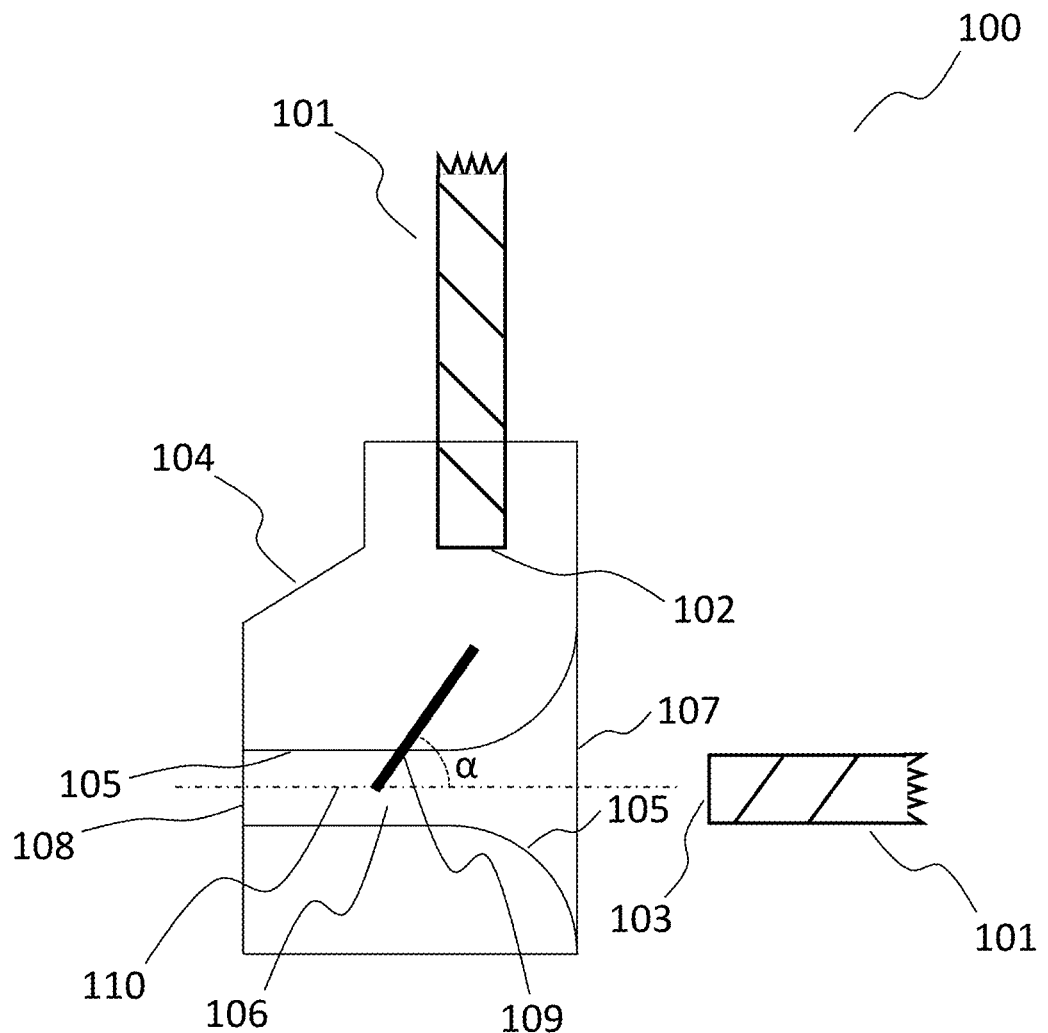
FIGS. 1 and 2 are cross-sectional views of an embodiment of a cable tie according to the present disclosure.
Figure 2:
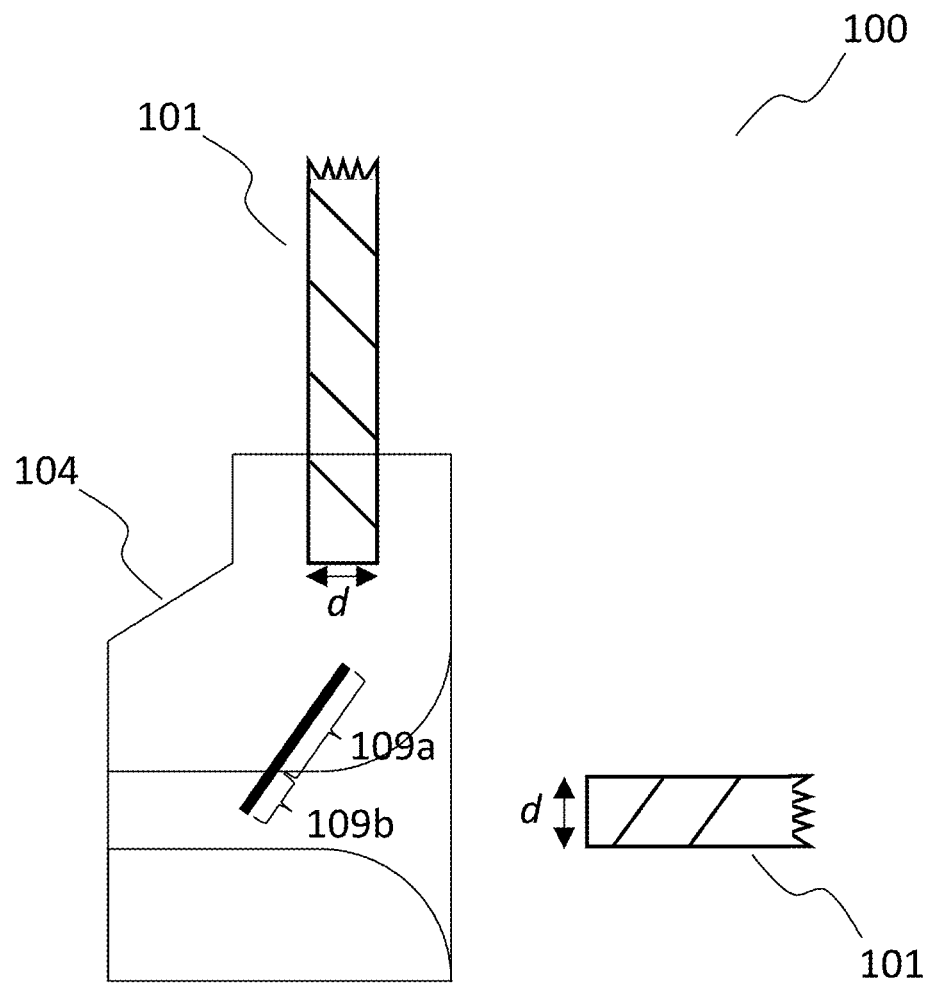

With reference to FIGS. 1 and 2, an embodiment of a cable tie 100 of the present disclosure is described.

The cable tie 100 comprises a cord 101 having a first 102 and a second 103 end. The cord 101 comprises cellulosic fibers, e.g. in the form of a paper. Preferably, the cord is formed by twisting a paper strip along its length. The paper and the forming technique are preferably selected such that high tensile strength and a certain stretchability is obtained (e.g. a stretch at break value of 2%-5%). A typical diameter d of the cord 101 may be 2 mm. A cord of such a diameter formed by a twisted paper strip may have a tensile strength (ISO 2062:1993) above 20 kg. In one embodiment, the paper used for the cord is waxed, which facilitates flattening of the second end. When the cord is formed from waxed paper, no heating is necessary in a pressing operation used to form the flattened second end. The tool used for such a pressing operation may have (a) contact surface(s) provided with ridges to form the above-mentioned grooves in the flattened second end.

The cable ties 100 further comprises a locking head 104 fixedly attached to the first end 102 of the cord 101. The fixation is preferably achieved by over-molding the first end 102 with a thermoplastic material that forms a body portion of the locking head 104.

As will be described in more detail below, the locking head 104 is adapted to receive the second end 103 and retain the cable tie 100 in a closed loop configuration.

The locking head 104 defines a wall 105 that encircles a passage 106. Alternatively, the locking head defines a plurality of walls that jointly encircles a passage 106. In either case, the wall(s) prevent(s) substantial lateral movement of the cord 101 when received in the passage 106.

Figure 3:
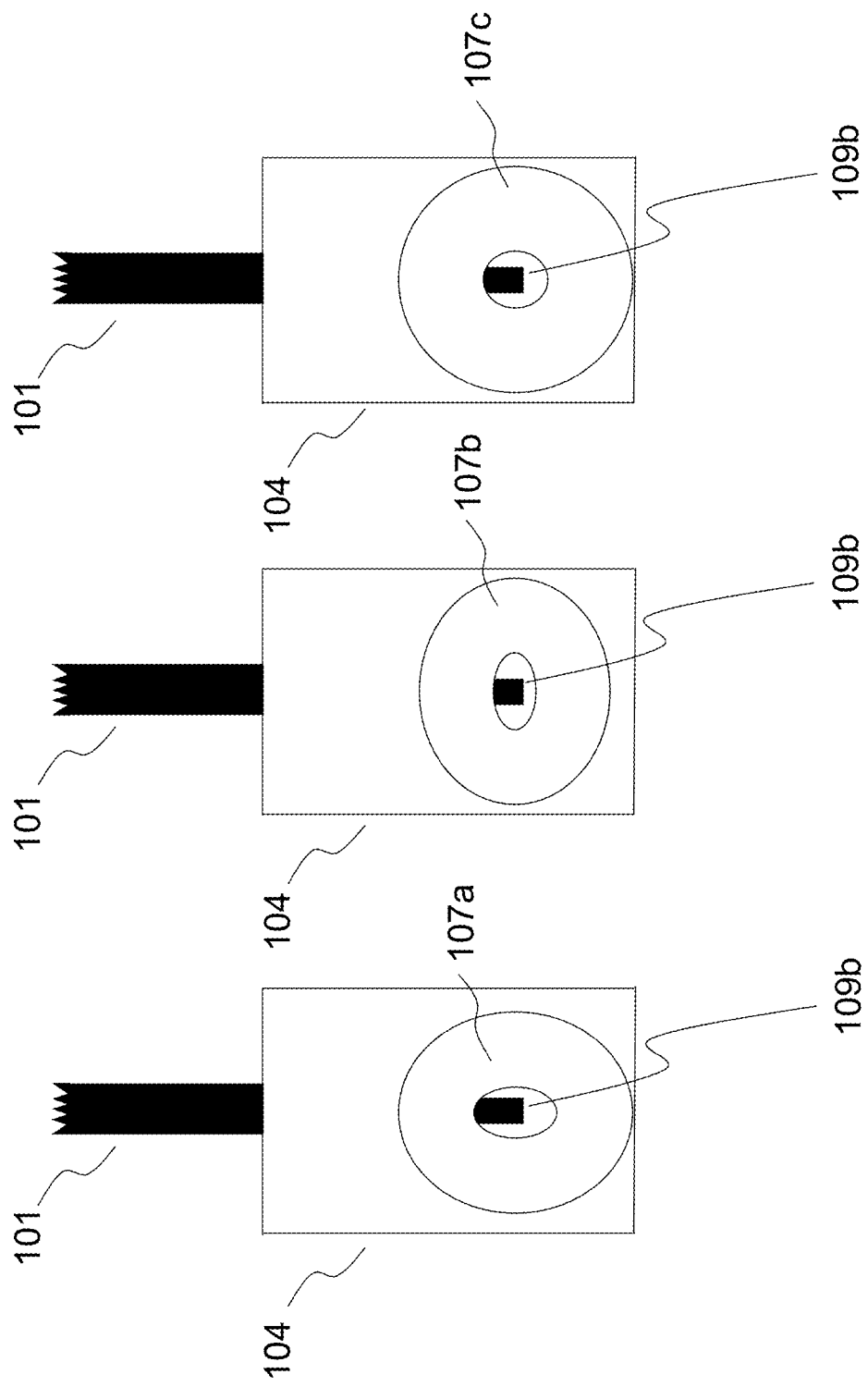
FIG. 3 show side views of three embodiments of a cable tie according to the present disclosure having different funnel-shaped inlets.

The passage 106 has an inlet 107 and an outlet 108. The inlet 107 is preferably funnel-shaped, such as trumpet-shaped, to facilitate manual insertion of the second end 103 into the passage 106. Different passage geometries and trumpet-shaped inlets 107a-c are shown in FIG. 3. To further facilitate the manual insertion, the second end 103 may be flattened.

The locking head 104 further comprises a metal blade 109 that extends into the passage 106 for engaging the cord 101 after receival thereof. The arrangement of the metal blade 109 is such that displacement of the received cord 101 in a first direction towards the outlet 108 is allowed (meaning that the loop formed when the second end 103 is received can be tightened) while displacement of the cord 101 in the opposite direction, i.e. a second direction towards the inlet 107, is prevented (meaning that the tie cannot be released without excessive force or destruction). In order to obtain these functions, the angle α between the direction of the extension of the blade 109 and a central axis 110 of the passage 106 is preferably 47°-62°, more preferably 50°-59°, most preferably 52°-57°. Further, the metal blade 109 preferably extends to such an extent that it intersects the central axis 110.

It is preferred to form the metal blade 109 from stainless steel, e.g. EN 1.4310.

The metal blade 109 typically has a first portion 109a that is embedded in the body portion of the locking head 104 and a second portion 109b that extends into the passage 106. The length of the extending portion 109b is preferably 55%-90%, such as 70%-90%, of the diameter d of the cord 101 and 20%-40%, such as 21%-35%, of the total length of the metal blade 109. As a specific example, the length of the extending portion 109b may be 1.10-1.79 mm when the total length of the metal blade 109 is 5.1 mm and the diameter d of the cord 101 is 2 mm.

The second portion 109b typically become embedded by over-molding with the thermoplastic material that forms the body portion of the locking head 104. Hence, the first end 102 of the cord 101 and the second portion 109b of the metal blade 109 may, during production, become embedded in the same over-molding step.

Accordingly, the diameter d of the cord 101 may be 26%-49%, preferably 31%-46%, more preferably 36-42%, of the total length of the metal blade 109.

The width of the metal blade 109 is typically 60%-80% (preferably 67%-73%, more preferably 73%-77%) of the diameter d of the cord 101. Further, the thickness of the metal blade 109 is typically 7-20% (preferably 10-15%) of the diameter d of the cord 101.

By the design consideration described above, suitable resilient properties that facilitate the locking action of the blade 109 are obtained.

The invention claimed is:

1. A cable tie (100) comprising:
   a paper cord that is twisted along its length (101) having a first end (102) and a second end (103); and
   a locking head (104) fixedly attached to the first end (102), said locking head (104) being adapted to receive the second end (103) and retain the cable tie (100) in a closed loop configuration,
   wherein said locking head (104) defines (a) wall(s) (105) that encircles a passage (106) having an inlet (107) and an outlet (108) and comprises a metal blade (109) that extends into the passage (106) for engaging the cord (101) and which is arranged to allow displacement of the cord (101) in a first direction towards the outlet (108) while preventing displacement of the cord (101) in a second direction towards the inlet (107).

2. The cable tie (100) of claim 1, wherein the passage (106) has a central axis (110) and the angle (α) between the direction of the extension of the blade (109) and the central axis (110) is 47°–62°.

3. The cable tie (100) of claim 1, wherein the metal blade (109) intersects the central axis (110) of the passage (106).

4. The cable tie (100) of claim 1, wherein the metal of the metal blade (109) is steel.

5. The cable tie (100) of claim 1, wherein the metal blade (109) has an embedded portion (109a) and an extending portion (109b).

6. The cable tie (100) of claim 5, wherein the length of the extending portion (109b) is 55%-90% of the diameter (d) of the cord (101).

7. The cable tie (100) of claim 5, wherein the length of the extending portion (109b) is 20%-40% of the total length of the metal blade (109).

8. The cable tie (100) of claim 1, wherein the diameter (d) of the cord (101) is 26%-49% of the total length of the metal blade (109).

9. The cable tie (100) of claim 1, wherein the width of the metal blade (109) is 60%-80% of the diameter (d) of the cord (101).

10. The cable tie (100) of claim 1, wherein the thickness of the metal blade (109) is 7-20% of the diameter (d) of the cord (101).

11. The cable tie (100) of claim 1, wherein the cord (101) is formed from hemp or paper.

12. The cable tie (100) of claim 1, wherein the cable tie has a stretch at break of the cord (101) being 2.5%-6.0% when measured according to ISO 2062:1993.

13. The cable tie (100) of claim 1, wherein the diameter (d) of the cord (101) is 1.0-8.0 mm.

14. The cable tie (100) of claim 1, wherein the locking head (104) comprises a body of a biodegradable material.

15. The cable (100) tie of claim 1, wherein the inlet (107) of the passage (106) is funnel-shaped.

16. The cable tie (100) of claim 2, wherein the passage (106) has a central axis (110) and the angle (α) between the direction of the extension of the blade (109) and the central axis (110) is 50°-59°.

17. The cable tie (100) of claim 8, wherein the diameter (d) of the cord (101) is 31%-46% of the total length of the metal blade (109).

18. The cable tie (100) of claim 9, wherein the width of the metal blade (109) is 67%-73% of the diameter (d) of the cord (101).

19. The cable tie (100) of claim 9, wherein the width of the metal blade (109) is 73%-77% of the diameter (d) of the cord (101).

20. The cable tie (100) of claim 14, wherein the locking head (104) comprises a body of a bio composite of a biodegradable and/or renewable polymer and an organic fiber material.

* * * * *